TAPE RECORDING AND/OR REPRODUCING SYSTEM AND METHOD

Filed Aug. 8, 1958 6 Sheets-Sheet 1

HAROLD V. CLARK
JOSEPH ROIZEN
JOHN F. VARNELL JR.
*INVENTORS*

BY
Fleht and Swain
ATTORNEYS

TAPE RECORDING AND/OR REPRODUCING SYSTEM AND METHOD
Filed Aug. 8, 1958 6 Sheets-Sheet 2
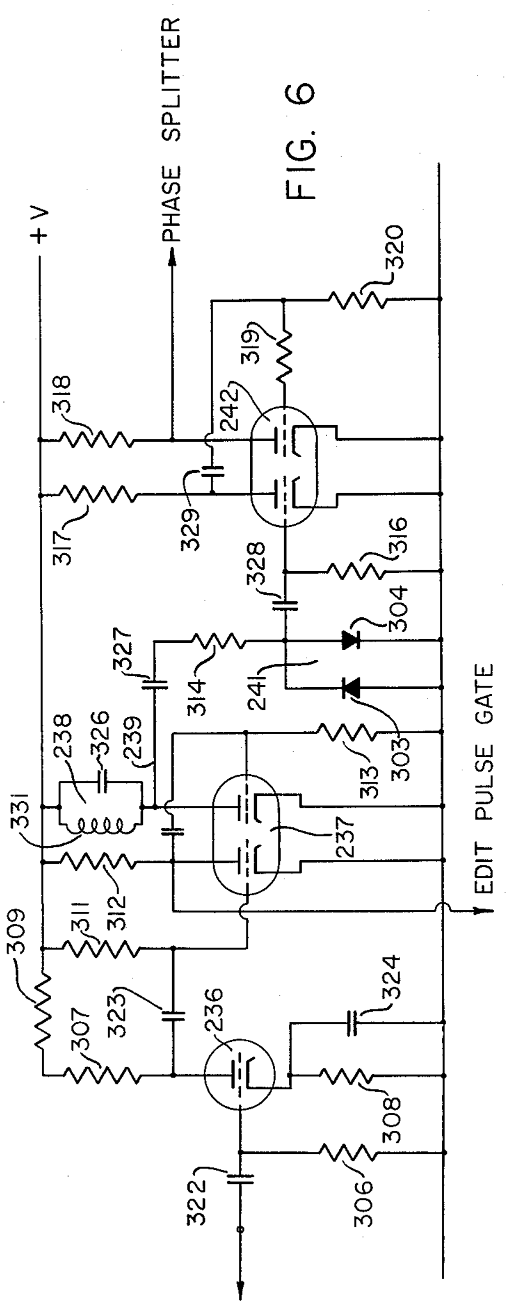
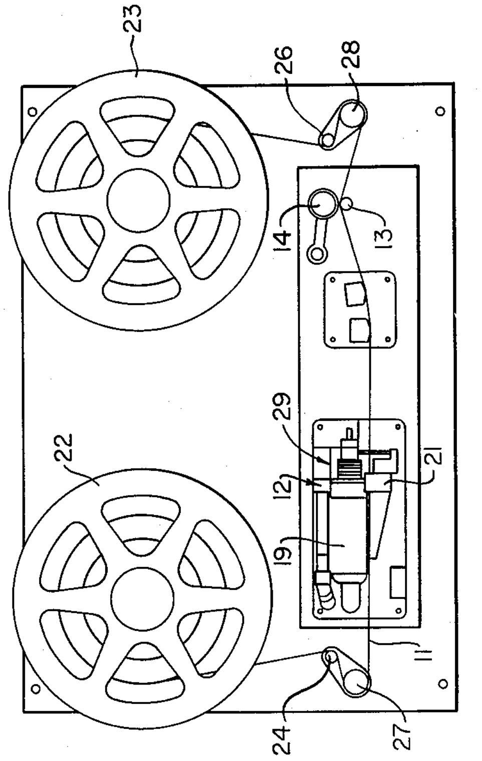
FIG. 2
HAROLD V. CLARK
JOSEPH ROIZEN
JOHN F. VARNELL JR.
INVENTORS
BY
Flehr and Swain
ATTORNEYS

TAPE RECORDING AND/OR REPRODUCING SYSTEM AND METHOD

Filed Aug. 8, 1958 6 Sheets-Sheet 3

HAROLD V. CLARK
JOSEPH ROIZEN
JOHN F. VARNELL JR.
*INVENTORS*

BY

Flehr and Swain
ATTORNEYS

TAPE RECORDING AND/OR REPRODUCING SYSTEM AND METHOD

Filed Aug. 8, 1958 6 Sheets-Sheet 4

HAROLD V. CLARK
JOSEPH ROIZEN
JOHN F. VARNELL JR.
INVENTORS

BY
ATTORNEYS

TAPE RECORDING AND/OR REPRODUCING SYSTEM AND METHOD

Filed Aug. 8, 1958 6 Sheets-Sheet 5

HAROLD V. CLARK
JOSEPH ROIZEN
JOHN F. VARNELL JR.
*INVENTORS*

BY Flehr and Swain
*ATTORNEYS*

TAPE RECORDING AND/OR REPRODUCING SYSTEM AND METHOD

Filed Aug. 8, 1958 6 Sheets-Sheet 6

HAROLD V. CLARK
JOSEPH ROIZEN
JOHN F. VARNELL JR.
*INVENTORS*

BY
Flehr and Swain
ATTORNEYS

United States Patent Office 3,097,267

Patented July 9, 1963

3,097,267

TAPE RECORDING AND/OR REPRODUCING SYSTEM AND METHOD

Harold V. Clark, Menlo Park, Joseph Roizen, Palo Alto, and John F. Varnell, Jr., Menlo Park, Calif., assignors to Ampex Corporation, Redwood City, Calif., a corporation of California Filed Aug. 8, 1958, Ser. No. 754,098
11 Claims. (Cl. 179—100.2)

This invention relates generally to a tape recording and/or reproducing system and method, and more particularly to a tape recording and/or reproducing system and method suitable for recording video information such as monochrome or color television signals.

In copending applications Serial No. 524,004, filed July 25, 1955, now Patent No. 2,956,114, and Serial No. 427,138, filed May 3, 1954, now Patent No. 2,916,546, there is disclosed a system and apparatus making use of a rotary head assembly for recording intelligence which occupies a relatively wide frequency and/or reproducing signal spectrum. The head assembly employs one or more transducer units or heads which are mounted to rotate and sweep across a pliable tape-like medium, such as a magnetic tape. A concave guide holds the tape in cupped condition to conform to the sweep path of the transducing unit and to guide the same past the units.

In copending application Serial No. 722,558, filed March 19, 1958, now Patent No. 3,037,073, there is disclosed a system in which editing signals are recorded on the magnetic tape. The editing signals are subsequently employed for splicing, editing and the like. The use of editing signals permits splicing without disturbing the synchronizing (timing) information whereby the recorder does not lose synchronism when recording, nor when a splice occurs during playback. In the splicing system disclosed, the edit signals are so located that the splice occurs at the end of one television field and at the beginning of the next field.

In recording and reproducing systems of the above character, the system is referenced to the power line frequency or to a suitable reference frequency. For example, when recording television signals, the synchronizing signals which are available may be used as a reference frequency. The rotary head assembly is driven from the reference frequency. The head assembly is synchronized and positioned with respect to the sync signal or to the power line frequency.

When switching from one reference source to another, for example, in switching to record signal information from various locations, there may be phase differences which cause the heads to lose synchronism and position with respect to the reference frequency. In such event, it is necessary that the heads be rapidly brought into synchronism.

Also, during the recording and reproducing process, the rotating head assembly is subjected to changes in the mechanical load, as when the heads contact and leave the magnetic tape. There are also transient electrical disturbances, for example, momentary changes in frequency and phase of the signal applied to drive the rotating head assembly. Such transient disturbances cause the motor velocity to hunt or oscillate about its proper position. Distortions are introduced in the recorded or reproduced signal. When disturbances occur in the reproducing and/or recording apparatus, it is desirable to avoid splicing at such a position since the splice will cause additional distortions.

It is a general object of the present invention to provide an improved recording and/or reproducing system and method.

It is another object of the present invention to provide an improved recording and/or reproducing system and method in which the relative velocity of the various parts is maintained in synchronism and relatively constant.

It is another object of the present invention to provide a tape recording and/or reproducing system and method which includes a pair of feedback loops for synchronizing and positioning the video heads with respect to a reference frequency and which also provides means for damping any oscillatory motion of the head assembly.

It is another object of the present invention to provide a tape recording and reproducing system and method of the above character in which a control system including a slow feedback loop serves to synchronize and position the video heads and in which a fast feedback loop serves to eliminate or reduce effects produced by electrical and mechanical disturbances.

It is still a further object of the present invention to provide a tape recording and reproducing system and method which includes means for forming pulses and controlling the application of such editing pulses to the magnetic tape whereby editing pulses are applied only when the system is in stable operation.

These and other objects of the invention will become more clearly apparent from the following description when taken in conjunction with the accompanying drawing.

Referring to the drawing:

FIGURE 2 is a plan view illustrating a suitable tape transport assembly;

FIGURE 6 is a schematic diagram showing a portion of the circuit of FIGURE 5;

Figure 1:
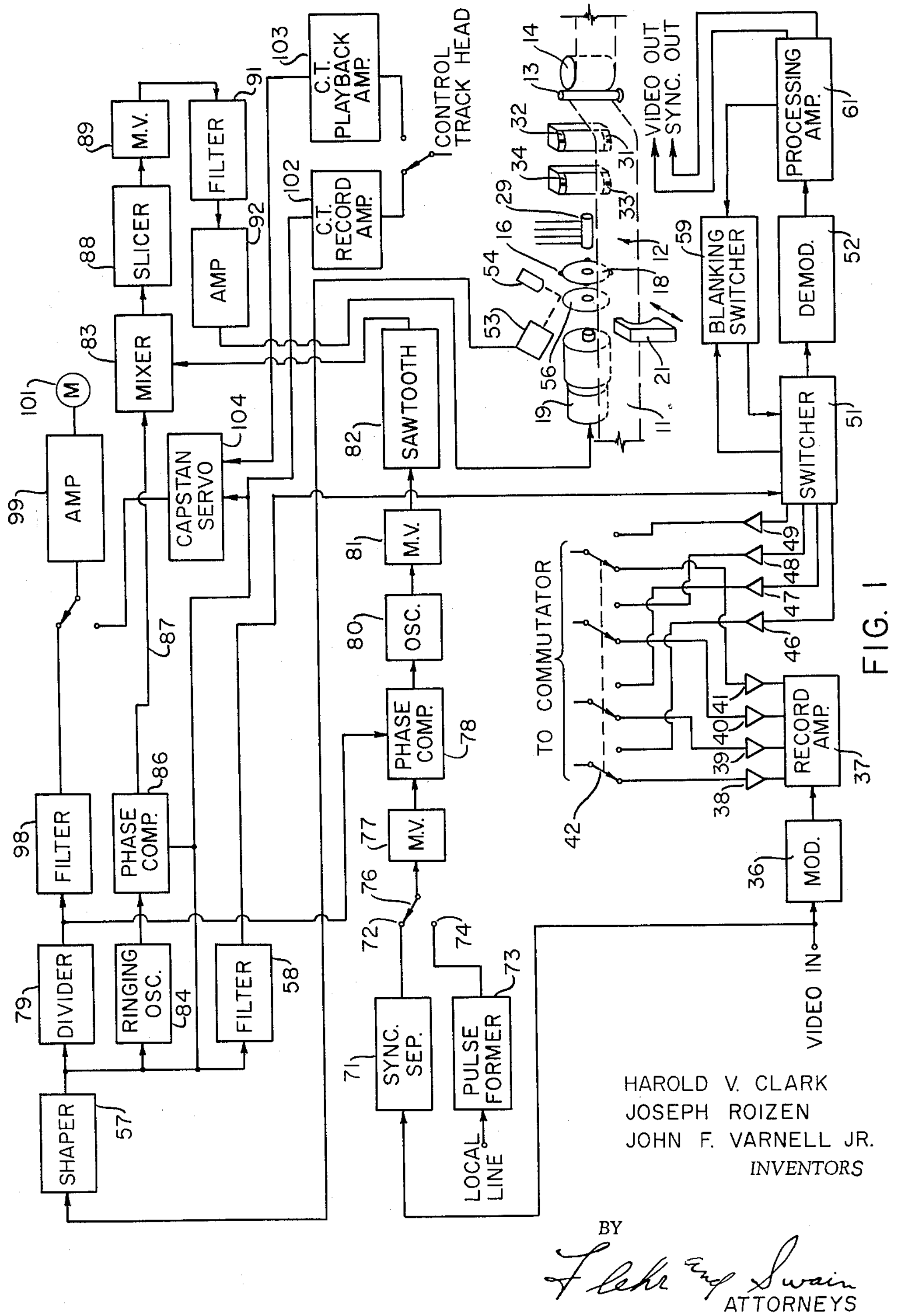
FIGURE 1 is a schematic and block diagram illustrating magnetic tape recording and/or reproducing apparatus in accordance with the present invention.

Referring to FIGURES 1 and 2, the magnetic tape 11 is driven lengthwise past the transducing head assembly 12 by means of a capstan drive 13 acting in conjunction with the capstan idler 14. A plurality of transducer heads or units 16 is carried on the periphery of a head disk or drum 18 driven by a synchronous motor 19. Suitable guide means 21 serve to cup and guide the tape as it is drawn past the transducing units. The guide means 21 may include a cut-out portion (not shown) to which a vacuum is applied to retain the tape in contact with the surface of the guide. As the transducer units sweep through the circular path, they consecutively make contact with the tape.

The tape 11 is supplied from a supply reel 22 and wound onto a take-up reel 23. The tape is guided past the transducing head assembly 12 by means of self-aligning guide posts 24, 26 and rollers 27 and 28. The tape-up reels may be carried on turntables and motors are provided for driving the turntables in accordance with customary practice.

The heads are connected to the electronic elements of the system by commutator 29, schematically illustrated in FIGURES 1 and 2. The commutator may, for example, include slip rings connected to each one of the heads and stationary brushes serving to make sliding contact with the associated rings.

During recording, the rotational velocity of the head drum 18 and of the capstan 13 are maintained with a specified relationship. During reproduction, the same relationship is maintained within narrow limits. For this purpose, a control signal is recorded on a control track along one margin of the tape by a magnetic transducing device 31. A control signal is recorded as a control track during recording, and during reproduction it is reproduced, amplified and used to control the relative speeds of the head drum and capstan drive in a manner to be presently described. A recording head 32 serves to record the sound information along the other side margin of the tape. Sound track and control track erase heads 33 and 34 may precede the heads 31 and 32, respectively.

The electronic circuitry illustrated in block diagram in FIGURE 1 may be divided into speed control circuitry and signal recording circuitry. For a clear understanding of the invention, the two circuits will be described separately.

The signal recording and reproducing circuitry is illustrated in the lower portion of FIGURE 1. The circuitry can include suitable means for producing a modulated carrier together with suitable recording amplifiers. F.M. recording is preferred, although A.M. recording may be used. The record electronics can consist of a modulator 36 which receives the input signal and a record amplifier 37 connected to receive the output of the modulator. The output from the record amplifier 37 is continuously applied to the individual head amplifiers 38, 39, 40 and 41. During recording, the switch 42 is positioned to connect the brushes to the record amplifiers 38—41.

As mentioned above, it is preferable to use F.M. recording. The type of F.M. recording which can be used for satisfactory recording and reproduction of video images is disclosed in U.S. Patent No. 2,956,114.

During reproduction, the switch 42 is connected whereby the output of each head is individually fed to its own preamplifier 46, 47, 48 and 49. The amplifiers are connected to feed their outputs to the switcher 51. From the switcher, a single channel signal (combined signal) is fed to a demodulator 52. The switcher serves to electronically switch to the individual outputs of the amplifiers 46—49 sequentially and alternately, as the respective heads are swept across the tape.

It is apparent that during reproduction it is necessary to derive the amplified output signal from one head at a time, switching from one preamplifier 46—49 to the next at a moment in the signal when minimum disturbance will be introduced in the reproduced signal. An electronic switcher may be employed and may be of the type described in copending application Serial No. 614,420, filed October 8, 1956, now Patent No. 2,968,692.

The switching system may, for example, comprise gated electron tubes which act as individual switches for the signals from each of the four preamplifiers. Gating pulses for these tubes are derived from a squarewave generated by a photocell 53 which acts in conjunction with a light source 54. The light source is projected on a disk or wheel 56 which is coated half black and half white. The photocell generates a squarewave form having a frequency which is dependent upon the speed of rotation of the head drum. The output signal is applied to a shaper 57 which shapes the same, and thence to a filter 58. The output of the filter 58 is applied to the switcher. The duty of the switcher is to develop from this initial timing signal the pulses necessary for switching the associated tubes at the proper instant of time.

When reproducing television information, it is desirable to employ a blanking switcher 59 in conjunction with the switcher to cause the switching action to occur during horizontal blanking intervals. The blanking switcher obtains its information from the processing amplifier 61. The signal which has been demodulated by the demodulator 52 is applied to the processing amplifier 61. This amplifier is designed to make the final output of the reproduced signal acceptable for rebroadcast or retransmission. Its main purpose is to eliminate all objectionable noise from (or in between) the blanking and sync pulses; and to limit to specified peak values any noise during the picture interval. In addition, the processing amplifier provides means for correcting the video linearity and local or remote control at both video and sync levels. A processing amplifier suitable for performing these operations is described in detail in copending application Serial No. 636,536, filed January 28, 1957, now U.S. Patent No. 3,005,869.

As previously described, the rotational velocity of the head drum 18 is maintained in synchronism and position with the incoming reference signal, and preferably means are also provided for damping out any oscillations of the head drum due to transient disturbances which arise either from electrical or mechanical sources. A servo system may be employed for accurately positioning the heads with respect to the input reference frequency and for synchronizing the rotation of the heads with respect thereto. As a result, the recorded signal will be laid down identically from track to track. The system to be described includes a slow servo loop which serves to synchronize and position, and a fast servo loop which serves to damp out any oscillations in head positioning due to mechanical or electrical transients.

The reference frequency may either be derived from the video input signal or from a local line source. Referring to FIGURE 1, the video signal is applied to a sync separator 71 which serves to separate out the sync pulses and supply the same to terminal 72. When local line frequency is employed, the input line is connected to a pulse former 73 which serves to form pulses having the line frequency and supplying the same to the terminal 74. A switch 76 is provided whereby the apparatus may be referenced either to the line or to the video signal as desired.

The selected timing pulses are applied to a multivibrator 77 which forms squarewaves and supplies the same to a phase comparator 78. The phase of the squarewave signal from the multivibrator 77 is compared with the phase of the signal from the divider 79 and a control signal is derived therefrom. The output of the divider 79 corresponds in phase to the output of the photocell 53 which is shaped and divided down to have the same frequency as that of the multivibrator 77. If the phase and frequency of the signals applied to the phase comparator are equal, there will be no output signal and the reactance tube oscillator 80 will oscillate at its nominal frequency. However, if there is a phase difference, a signal is fed to the oscillator which increases or decreases its frequency of operation. The output of the oscillator is applied to a multivibrator 81 whose output is applied to a sawtooth generator 82. The output from the sawtooth generator is applied to a mixer 83.

The shaped photocell output is also applied to a ringing oscillator 84 and serves to trigger the ringing oscillator whereby it produces damped sinusoidal oscillations in phase with the pulses applied thereto. The output of the ringing oscillator is applied to a phase comparator 86. The signal from the shaper is also applied directly to the phase comparator. Thus, the phase comparator serves to compare the phase of the direct pulse with that of the preceding pulse from the photocell. Any variations in head velocity during this interval will generate an error signal on the line 87. The error signal is applied to the mixer 83. The mixer 83 serves to raise and lower the level of the sawtooth voltage applied thereto. This sawtooth voltage is applied to a slicer 88 which serves to slice out a small predetermined portion. Thus, as the error signal raises and lowers the level of the sawtooth voltage, the phase of the trailing edge of the sliced signal will be changed. The trailing edge of the sliced signal serves to trigger a multivibrator 89 which generates a squarewave having frequency and phase which is dependent upon the difference between the photocell output and the reference frequency, and also dependent upon any changes in head velocity between successive generated electrical pulses.

The output of the multivibrator is applied to a filter 91 which forms a sinewave for application to a three phase amplifier 92 which drives the synchronous motor 19.

Figure 7:
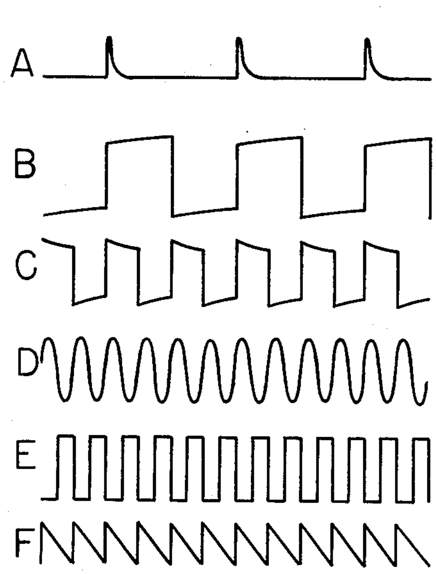
FIGURES 7 and 8 depict the waveforms at various points in the circuit of FIGURES 1, 3 and 5.
Figure 9:
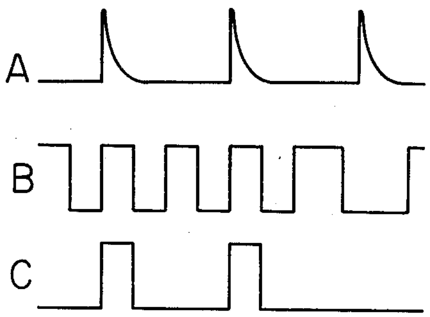
FIGURE 9 represents waveforms at various points in the circuit forming the edit pulse.
Figure 8:
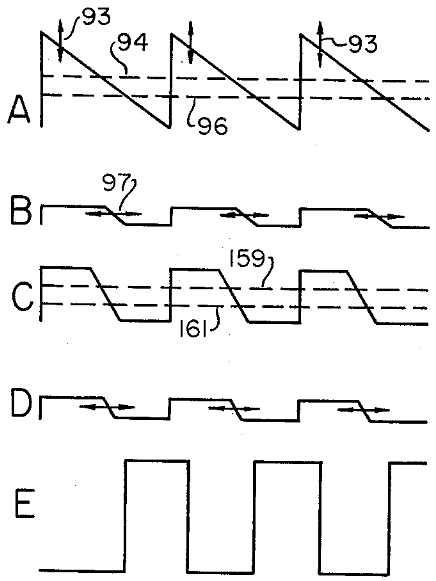

A clearer understanding of the operation of the circuit can be had with reference to FIGURES 7 and 8. In FIGURE 7A, the video synchronizing pulses which appear at the terminal 72 are illustrated. In FIGURE 7B, there is schematically illustrated the squarewave output of the multivibrator 77. The input from the divider 79 has the same frequency. FIGURE 7C represents the output of the phase comparator which is applied through a filter to obtain its D.C. component. The D.C. signal is then employed to control an oscillator 80 whose output is shown in FIGURE 7D. The phase of this signal is controlled by the photocell output. The oscillator output is then applied to the multivibrator 81 which forms a wave of the type shown in FIGURE 7E and thence to the sawtooth generator 82 for generating a sawtooth voltage as shown in FIGURE 7F.

Referring to FIGURE 8, the operation of the mixer and slicer is more clearly shown. In FIGURE 8A, the sawtooth voltage applied to the mixer is illustrated enlarged from that of FIGURE 7F. This voltage is moved upwardly and downwardly as indicated by the arrows 93. The slicer passes only a fixed amount of the waveform which has a fixed position as indicated by the dotted lines 94 and 96. Thus, as the sawtooth voltage level moves up and down, the trailing edge of the output of the slicer, shown in FIGURE 8B, moves phase-wise as shown by the arrows 97. Thus, by lowering the sawtooth voltage level, the trailing edge moves to the left as shown in the figure, and by raising the sawtooth voltage, it moves to the right. It is observed that a full 360° phase shift may be obtained. In the circuit of FIGURE 1, the trailing edge is then used to trigger a multivibrator which generates a squarewave as shown in FIGURE 8E.

Thus, it is seen that the signal applied to the motor 19 is at four times the frequency of the synchronizing waveform as is the output of the photocell. The complete system is synchronized with respect to the reference frequency and is stabilized with respect to changes in velocity of the head drum. The effect of this system is to make a recording in which the vertical synchronizing pulses have a predetermined position on the magnetic tape within narrow limits.

The output of the divider 79 is also applied to a filter 98 which forms an output signal of substantially sinewave form from the squarewave applied thereto. During the record operation, the output of the filter 98 is applied to an amplifier 99 and the amplified signal is employed to drive the capstan motor 101. Thus, the capstan motor is driven at a rotational velocity which is directly related to the rotational velocity of the head drum 18. In essence, the capstan is enslaved to the head drum. The tape moves a predetermined distance lengthwise each complete revolution of the head drum.

The output from the shaper 57 is also applied to the control track amplifier 102. The output of the amplifier 102 is applied to the record head 31 to form a record track along the margin.

During reproduction, the control frequency is again applied. The frequency may be the 60 cycle line frequency, a local oscillator frequency or the synchronizing video signal frequency. This signal is applied to the servo system previously described and serves to drive the head drum motor at the correct rotational velocity. The control track head is connected to a playback amplifier 103 and the amplified signal is applied to the capstan servo 104. The capstan servo includes a phase comparator which compares the reproduced control signal with the signal output of the photocell to derive an error signal. The error signal is applied through a filter to the grid of a reactance tube which is one of the frequency determining elements of an oscillator. The oscillator functions nominally at the correct frequency with the frequency being modified up or down by the error signal. The modified signal is fed to the amplifier 99 which drives the capstan 101. Thus, the capstan motor advances the tape a predetermined distance corresponding to that during recording for each revolution of a head drum whereby the plurality of heads accurately tracks the previously recorded track portions.

The effect of the system described is to cause the capstan 13 to revolve during reproduction with exactly the same relationship to the revolving drum 18, within narrow limits, as it did during the recording process. Once the head drum is adjusted on the center of a track at the beginning of a reproduction, the system automatically holds the relationship constant and the revolving head traces accurately the recorded transverse tracks.

Figure 3:
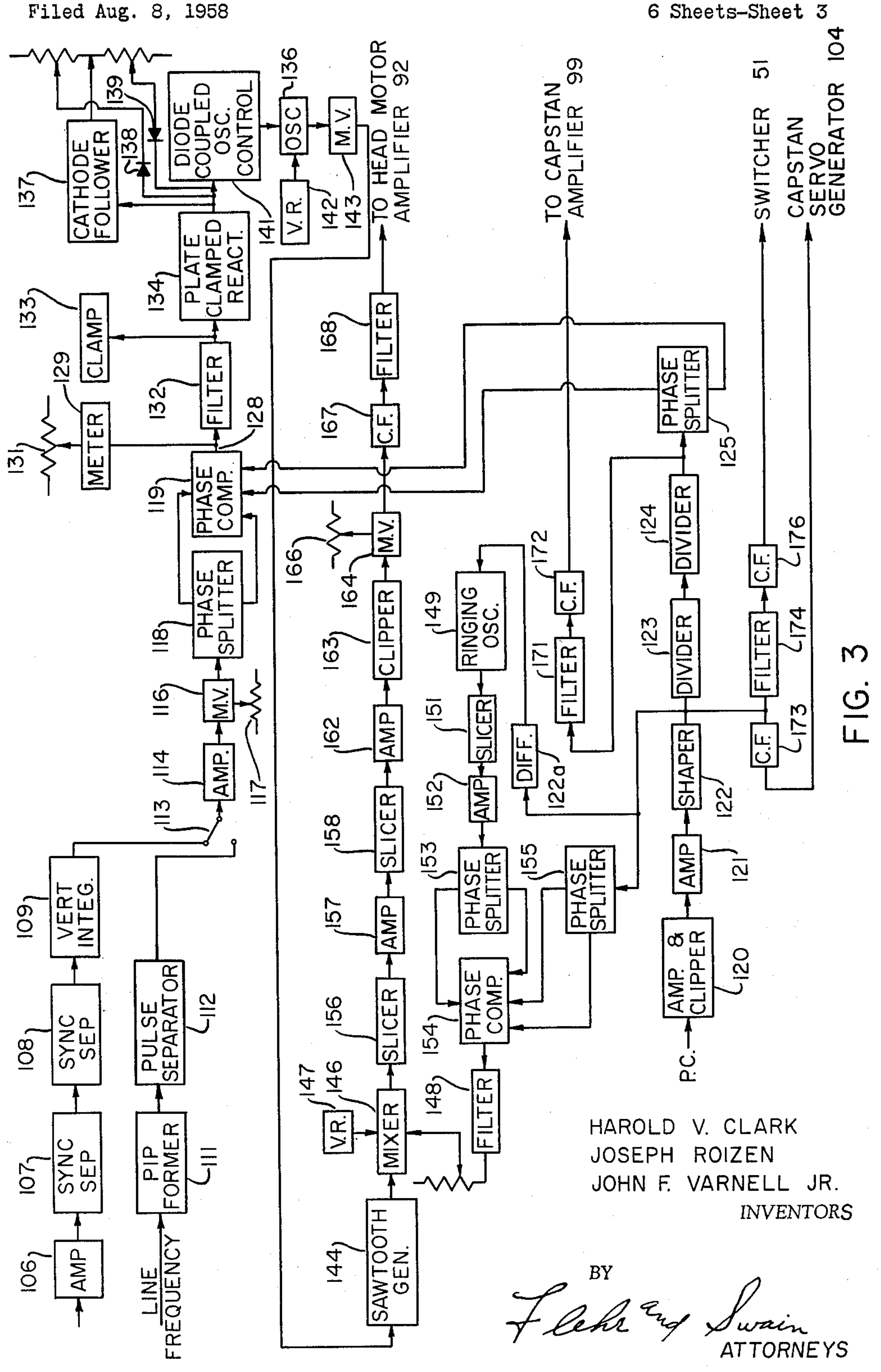
FIGURE 3 is a block diagram illustrating a control system in accordance with the present invention.

Referring to FIGURE 3, a more detailed block diagram of a control system is illustrated. The output video signal is applied to an amplifier 106 where it is amplified and applied to a pair of sync separators 107 and 108, and thence to a vertical integrator 109. Pulses having vertical video synchronizing frequency are formed. These pulses are the type illustrated in FIGURE 7A.

As previously described, the input may be derived from the power source in which instance the local power source, for example the 60 cycle source, is connected to a pip former 111 which may be a relaxation pip former. The output of the pip former is applied to a pulse separator 112 and the pulses appear at the respective terminal. A switch 113 is provided for switching either to pulses derived from the video signal or the local signal. The switch connects the selected reference pulses to an amplifier 114. The output of the amplifier is applied to a multivibrator 116 which forms a squarewave. The multivibrator may include means 117 for adjusting the symmetry of the squarewave.

The squarewave is applied to a phase splitter 118 and the two outputs from the phase splitter are applied to the phase comparator 119. The two signals applied to the phase comparator are squarewaves which have 180° phase relationship with respect to one another. The phase comparator 119 is a balanced comparator of a type to be described with respect to FIGURE 4. One of the signals applied to the phase comparator is shown in FIGURE 7B. It will be realized that the other signal is identical, but 180° out of phase with respect to the one illustrated.

The output of the photocell 53 is applied to an amplifier and clipper 120, thence to an amplifier 121 and shaper 122. The output of the shaper is applied to dividers 123 and 124 each serving to divide by two whereby the frequency is divided by four. The output of the divider 124 is applied to a phase splitter 125 which serves to form a pair of squarewaves which have 180° phase relationship. These squarewaves are applied to the phase comparator 119. The phases of the signals applied to the phase comparator from the phase splitters 118 and 125 are compared. An output error signal having two times the frequency of the squarewaves and a D.C. component which is dependent upon the phase difference is formed. The error signal is illustrated in FIGURE 7C.

The error signal is applied to an indicating meter 129 which has a balance adjustment 131. The meter serves to indicate the difference in phase between the reference signal and the signal generated by the photocell.

The signal from the line 128 is also applied to a filter 132 which passes the D.C. component of the control signal. The magnitude of the D.C. signal is clamped or limited by clamping means 133. The clamped signal is applied to a plate-clamped reactance stage 134, which reactance stage serves to control the reactance of the tuned circuit of an oscillator 136. Special means are provided whereby the frequency cannot instantaneously change more than a predetermined amount. Such means comprises a cathode follower 137 which changes the clamping level of a pair of clamps 138 and 139. The clamps 138 and 139 determine the amount of signal applied to the diode coupled oscillator control circuit 141. As a steady state change in oscillator frequency is dictated by the control voltage, the clamp level rises or lowers to continually change the oscillating frequency until the average of the clamped voltage is such as to give the correct oscillating frequency. The arrangement prevents sudden changes in frequency which might exceed the ability of associated equipment to follow. A voltage regulating tube 142 provides a suitable regulated voltage to the oscillator.

The oscillator 136 operates nominally at the correct frequency. If there is a phase error between the signals applied to the phase comparator 119, the phase error serves to change the frequency of the oscillator in a direction whereby the signals come back to the correct phase relationship. The clamping circuits prevent the oscillator from undergoing large frequency changes if the two signals are out of phase by a substantial amount. The clamping level gradually changes whereby the oscillator finally reaches the correct operating frequency. The sinewave from the oscillator 136 is illustrated in FIGURE 7D.

The sinewave output of oscillator 136 is applied to a multivibrator 143 giving a waveform of the type shown in FIGURE 7E, and thence to a sawtooth generator 144 giving a sawtooth wave of the type shown in FIGURE 7F. The output of the sawtooth generator is applied to a mixer 146 which has its voltage controlled by voltage regulating tube 147. A second signal is applied to the mixer 146 from the filter 148.

The signal from the filter 148 is derived from the output of the photocell. In this respect, the output from the shaper 122 after differentiation 122*a* is applied to a ringing oscillator 149. Thus, each cycle of the squarewave serves to energize the ringing oscillator whereby it forms damped oscillations which are shifted in phase by an amount proportional to the difference between the frequency of the squarewave and the natural resonant frequency of the ringing oscillator. The output of the ringing oscillator is applied through a slicer circuit 151 and amplifier 152 to a phase splitter 153 which serves to provide a pair of signals having a 180° phase relationship. These signals are applied to a phase comparator 154.

Also applied to the phase comparator is a signal directly from the shaper 122. The signal from the shaper 122 is applied to a phase splitter 155 which forms a pair of signals having a 180° phase relationship. These signals are applied to the phase comparator 154. In operation, the phase comparator receives pulses directly from the photocell and phase shifted pulses which have the phase of the ringing oscillator 149. Any slight change in head velocity results in an error signal from the phase comparator 154 which is applied to the filter 148.

The signal from the filter 148 is applied to the mixer 146 and serves to raise and lower the level of the sawtooth voltage as indicated by the arrow 93 in FIGURE 8A. The output of the mixer is applied to a slicer 156 which serves to slice the sawtooth wave as indicated in FIGURE 8B, and as previously described. Thus, the trailing edge of the sliced wave may be varied in phase as indicated by the arrow 97. The sliced signal is further amplified by the amplifier 157 and applied to a second slicer 158 which slices as indicated by lines 159 and 161 in FIGURE 8C. The sliced amplified signal is shown in FIGURE 8D. By further amplification and slicing, a trailing edge having a sharp rise is generated.

This sliced signal is amplified by amplifier 162, clipped by clipper 163 and employed to trigger a multivibrator 164. The multivibrator 164 includes means for adjusting the symmetry of the wave as indicated by the adjustable resistor 166. The output of the multivibrator is applied from a cathode follower 167 to a filter 168, and thence to the head motor amplifier 92, previously described.

Thus, it is seen that the circuit described includes a pair of servo loops: an upper loop which is a slow servo loop and which serves to synchronize and position the heads with respect to the reference frequency; and a lower servo loop including the ringing oscillator, mixer and slicers which serve to correct the phase of the output of the oscillator in such a manner as to damp out any head drum oscillations due to mechanical or electrical disturbances.

Referring again to the drawing, the output of the divider 124 is applied to a filter 171, and thence to a cathode follower 172. The output of the cathode follower is applied to the capstan amplifier 99, previously described. The output of the shaper 122 is applied to a cathode follower 173, and thence to the capstan servo amplifier 104, previously described. The output of the shaper is also applied to a filter 174, cathode follower 176 and to switcher 51, previously described.

A circuit diagram showing a phase comparator and oscillator of the type described above is shown in FIGURE 4. The phase comparator illustrated is the phase comparator 119; however, it is identical in construction and operation to the phase comparator 154. The output of the multivibrator 116 is applied to the grid of the tube 181 which is connected as a phase splitter whereby signals of opposite polarity are capacitively coupled to the terminals 182 and 183 of the phase comparator. The output from the divider 124 is applied to the grid of the tube 184 which is also connected as a phase splitter and whose outputs are applied to the terminals 186 and 187 of the phase comparator. The phase comparator includes four pair of resistors 191*a,b*; 192*a,b*; 193*a,b*; and 194*a,b*, connected in a bridge circuit with the common terminal of each of the pairs connected to a terminal of the diodes 196, 197, 198 and 199, respectively. The other terminals of each of the diodes are connected to a common point. The diodes 196, 198 are oppositely poled to conduct toward the common junction, while the diodes 197 and 199 are poled to conduct away from the common junction.

The output signal is obtained at the common junction of the four diodes and is coupled to the grid of the reactance tube 201. The resistor 202 and capacitor 203 serve as a filter to filter the wave and apply a D.C. signal to the grid of the tube 201. The signal appearing on the line 204 is at two times the frequency of the signal applied to the bridge terminals, as previously described.

The clamping or limiting circuit previously described includes the diodes 206 and 207.

The oscillator is of the Colpitts type and includes the tube 208 and the frequency determining circuit designated generally by the reference numeral 209. The frequency of the oscillator is controlled by controlling the duty cycle of the capacitor 211. It is observed that the capacitor 211 is directly connected across the resonant circuit 209 when the diodes 212 and 213 are conducting.

By controlling the charge or current to the capacitor 211, the reactive current drawn by the capacitor is controlled to thereby control the resonant frequency of the frequency determining circuit 209.

The reactive current drawn by the capacitor is controlled by the tube 201. The current through the tube is controlled by the error signal applied to the grid as previously described. The output from this tube is limited by the oppositely poled diodes 214 and 216 whereby only certain magnitudes of current may be supplied to the capacitor 211. Current flows in the manner shown by the curve 217. During the portions of the cycle in which the current is not flowing into the capacitor, it is flowing through the diodes 212, 213 which are connected to the voltage stabilizing source 218. The oppositely poled reference window is lifted and lowered slowly by means of a circuit which includes the tube 219. The tube is connected in a modified bootstrap circuit. This tube is connected to receive the signal from the plate of the tube 201. As this signal changes, the tube serves to draw more or less current and is connected as a cathode follower to change the voltage at the point 221 whereby the reference voltage applied to the diodes changes. Thus, as the output signal from the tube 201 increases, the tube 219 slowly raises the reference signal whereby the diodes have a window which tends to be centered upon the error signal. The circuit operates then to provide instantaneous correction for a predetermined small frequency, which correction continues until the diodes are properly centered to apply a continuous signal to the capacitor 211.

Thus, it is seen that an improved phase comparator is provided in which the output frequency is two times the input frequency and which serves to compare accurately two pairs of input signals. The error signal is then applied to a reactance controlled oscillator circuit which operates nominally at the correct frequency but has its frequency adjusted upwardly and downwardly in response to changes between the reference phase and the phase of the signal from the photocell. The frequency can change instantaneously only a predetermined fixed amount.

Figure 5:
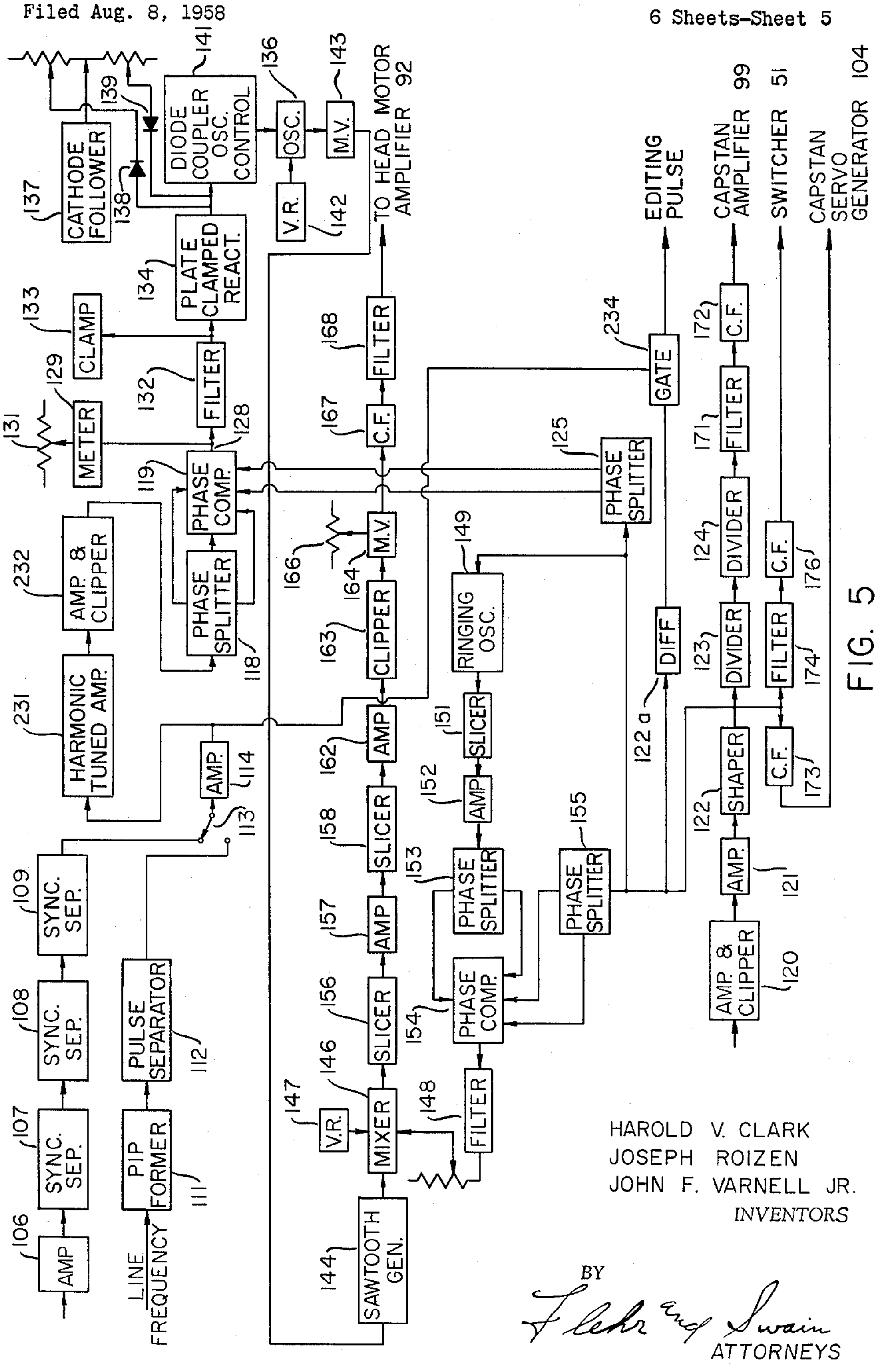
FIGURE 5 is a block diagram schematically illustrating another embodiment of the invention.

Referring to FIGURE 5, another embodiment of the invention is illustrated. This embodiment of the invention is similar to that of FIGURE 3 and like parts carry like reference numerals. The major difference in the two circuits is that the phase comparator 119 has a signal having the frequency of the photocell output applied thereto rather than a divided frequency. The signal from the amplifier 114 is applied to a harmonic tuned amplifier 231 which serves to form an output signal having a frequency four times the frequency of the input signal. The output of the harmonic tuned amplifier is then applied to an amplifier clipper stage 232 and thence to the phase splitter 118. The phase comparator is operated at four times the frequency of that of FIGURE 3 and, as a result, the system responds more rapidly to changes in phase.

In U.S. Patent No. 3,037,073, directed to splicing and editing, pulses were derived from the sync pulses and applied to the tape to delineate every field. In certain instances the head is hunting or the apparatus is not operating in synchronism with the reference frequency, a splice made at such a point in the recording results in an output signal which may cause rolling of a receiver.

In the embodiment of the invention shown in FIGURE 5, gating pulses are obtained from the output of the shaper 122 and applied to a coincidence gate 234. If the gate is open when the pulse appears at the shaper 122, an editing pulse is applied to and mixed with the control signal. However, if the gate is closed, the editing pulse is not passed and recorded. The gate is opened by the vertical sync pulses from amplifier 114. Thus, when the sync pulses are in synchronism and timed relationship with the generated pulses from the photocell, the gate 234 will be open to pass a pulse which is recorded as an editing pulse to identify the end of a field.

Suitable amplifier 114, harmonic tuned amplifier 231 and amplifier clipper 232 are illustrated in FIGURE 6. The input signal is amplified at the tube 236, applied to the first half of the dual tube 237 where it is further amplified and applied to the grid of the second half of the dual tube. The plate of the dual tube 237 includes a tuned circuit 238 tuned to the fourth harmonic. Thus, the signal on the line 239 will be the frequency of the fourth harmonic. This signal is applied to a clipper or window 241 which serves to shape the signal and then applied to the grid of the first tube of a dual tube 242 where it is amplified, applied to the grid of the second section, amplified and clipped in the second section and applied to the phase splitter in the manner previously described.

Figure 4:
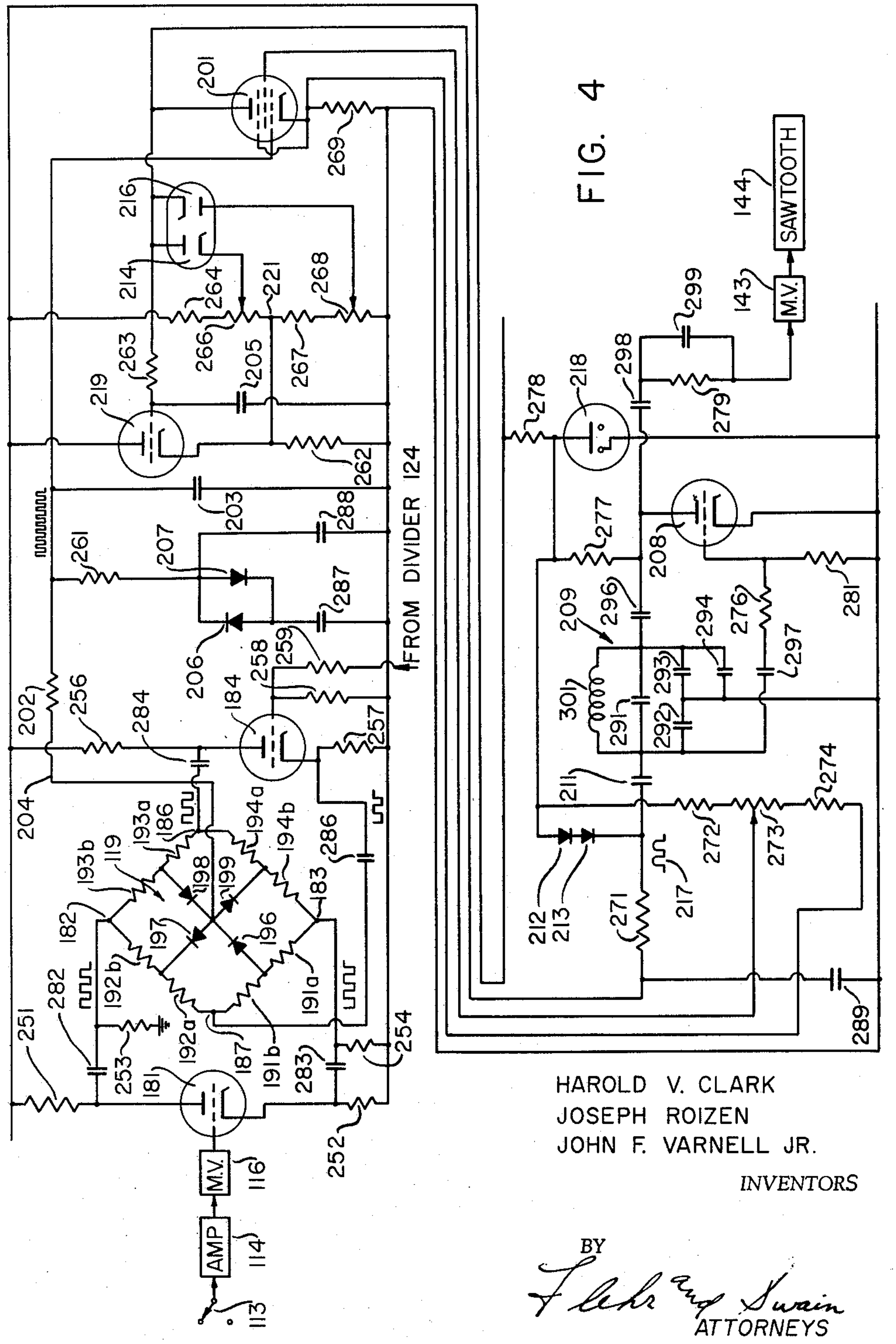
FIGURE 4 is a detailed circuit diagram of a portion of the control system of FIGURE 3.

Apparatus was constructed in accordance with FIGURE 3 and the circuit illustrated in FIGURE 4 in which the voltages and components were as follows:

| | | |
|---|---|---|
| Voltage: | | |
| +V | | 250 v. |
| Tubes: | | |
| **181** | | 5963 |
| **182** | | 5963 |
| **201** | | 6AN8 |
| **208** | | 6AN8 |
| **214, 216** | | 6AL5 |
| **218** | | OA2 |
| **219** | | 12AT7 |
| Diodes: | | |
| **196–199** | | IN279 |
| **206, 207** | | IN432 |
| **212, 213** | | IN68A |
| Resistors: | | |
| **191***a,b*–**194***a,b* | ohms each | 10K |
| **202** | megohm | 1 |
| **251** | ohms | 10K |
| **252** | do | 10K |
| **253** | do | 100K |
| **254** | do | 100K |
| **256** | do | 10K |
| **257** | do | 10K |
| **258** | do | 390K |
| **259** | do | 560K |
| **261** | do | 100K |
| **262** | do | 120K |
| **263** | megohms | 4.7 |
| **264** | ohms | 100K |
| **266** | do | 250K |
| **267** | do | 3.3K |
| **268** | do | 100K |
| **269** | do | 620 |
| **271** | do | 220K |
| **272** | do | 8.2K |
| **273** | do | 5K |
| **274** | do | 15K |
| **276** | do | 150 |
| **277** | do | 47K |
| **278** | do | 3.5K |
| **279** | do | 47K |
| **281** | megohms | 2.2 |
| Capacitors: | | |
| **203** | | 1 mf. |
| **211** | | .0051 mf. |
| **282** | | 1 mf. |
| **283** | | 1 mf. |
| **284** | | 1 mf. |
| **286** | | 1 mf. |
| **287** | | .02 mf. |
| **288** | | 6 mf. |
| **289** | | .1 mf. |
| **291** | | .004 mf. |
| **292** | | .015 mf. |
| **293** | | .03 mf. |
| **294** | | .03 mf. |
| **296** | | .47 mf. |
| **297** | | .047 mf. |
| **298** | | .01 mf. |
| **299** | | 150 mmf. |
| Inductors: | | |
| **301** | | 30 henry |

Apparatus constructed in accordance with the foregoing operated satisfactorily in recording U.S. standard video signals. Apparatus was also constructed for operation under European standard video signals and with the circuits of FIGURES 5 and 6. The various components were as follows:

| | |
|---|---|
| Voltage: | |
| +V | 250 v. |
| Tubes: | |
| **236** | 12AT7 |
| **237** | 12AT7 |
| **242** | 12AT7 |
| Diodes: | |
| **303, 304** | 1N279 |

Resistors:

| | | |
|---|---|---|
| 306 | ohms | 100K |
| 307 | do | 27K |
| 308 | do | 6.8K |
| 309 | do | 470 |
| 311 | megohm | 1 |
| 312 | ohms | 15K |
| 313 | megohms | 4.7 |
| 314 | do | 1 |
| 316 | do | 4.7 |
| 317 | ohms | 27K |
| 318 | do | 27K |
| 319 | megohms | 11 |
| 320 | do | 4.7 |

Capacitors:

| | |
|---|---|
| 322 | .1 mf. |
| 323 | .001 mf. |
| 324 | 25 mf. |
| 326 | .02 mf. |
| 327 | .05 mf. |
| 328 | .05 mf. |
| 329 | .05 mf. |

Inductor:

| | |
|---|---|
| 331 | 7–70 henry |

Apparatus in accordance with the foregoing was constructed and operated satisfactorily.

Thus, it is seen that there is provided a recording apparatus suitable for recording video signals. The control circuit illustrated and described, which includes two servo loops, serves to maintain the heads in synchronism and position with the reference signal and also to compensate for transient electrical and mechanical disturbances.

We claim:

1. In a system of the character described in which a magnetic tape is driven lengthwise in cooperative relationship with a rotary magnetic head assembly to form successive record tracks extending crosswise of the tape; means for deriving a first signal having a frequency which is dependent upon the speed of rotation of the magnetic head assembly, a source of reference signal of reference frequency, means adapted to receive said signals and form an intermediate output signal having its phase controlled by the phase differences between said signals, means forming an error signal which is dependent upon instantaneous changes in the frequency of the first signal, means serving to receive said error signal and said intermediate output signal and forming an output signal having an instantaneous phase which is controlled by the error signal, said output signal being applied to said rotary head assembly for driving the same.

2. In a method of the character described in which a magnetic tape is driven lengthwise in cooperative relationship with a rotary magnetic head assembly by a first motor, and in which a magnetic head assembly is driven by a second motor whereby it forms successive record tracks extending crosswise of the tape; the steps of generating a first signal having a frequency which is dependent upon the speed of rotation of the head assembly, comparing the phase of the generated frequency with a reference frequency, generating a second signal whose frequency is controlled by the phase difference between the signals, comparing the phase of the generated signal at two closely spaced intervals of time, controlling the phase of the second signal in accordance with the last named phase difference and applying the phase controlled second signal to the head assembly motor for driving the same.

3. In a system of the character described, a rotatable magnetic head assembly including at least one transducer unit, a tape transport means for moving the tape lengthwise past and in cooperative relationship with the head assembly whereby the unit sweeps successively across the tape, means for driving the head assembly, first pulse generating means for generating pulses at a frequency dependent upon the speed of rotation of the head assembly, second pulse generator means for producing pulses having a reference frequency, phase comparator means serving to receive said pulses and serving to generate a first error signal which is dependent upon the phase difference between the same, means adapted to receive said error signal and serving to generate a signal having a frequency which is controlled thereby, means for comparing the phase between successive pulses from said first pulse generating means and serving to generate a second error control signal, means adapted to receive the second error signal and said generated signal and to form an output signal frequency whose phase is instantaneously controlled in accordance with the second error signal, said signal being applied to said means for driving the head assembly.

4. In a system of the character described in which a magnetic tape is driven lengthwise in cooperative relationship with a rotary magnetic head assembly by a first motor and in which a magnetic head assembly is driven by a second motor whereby it forms successive record tracks extending crosswise of the tape, pulse generating means for generating first pulses at a frequency which is dependent upon the speed of rotation of the magnetic head assembly, means for generating second pulses having a reference frequency, first comparator means serving to receive said first and second pulses and serving to generate a first error signal which is dependent upon the phase difference between the applied pulses, oscillator means connected to receive said first error signal and serving to generate an intermediate signal having a frequency which is controlled thereby, means for deriving a second error signal which is dependent upon instantaneous changes in the frequency of the first pulses, means serving to receive the intermediate signal and the second error signal and serving to form an output signal whose phase is instantaneously controlled in accordance with the second error signal, said signal being applied to said second motor for driving the same, and means serving to receive the first pulses and forming a signal having a frequency dependent thereon, said last named signal being applied to the first motor to drive the same.

5. In a system of the character described, a rotatable magnetic head assembly including at least one transducer unit, a tape transport means for moving the tape lengthwise past and in cooperative relationship with the head assembly whereby the unit sweeps successively across the tape, means for driving the head assembly, pulse generating means for generating first pulses at a frequency dependent upon the speed of rotation of the head assembly, means for generating second pulses having a reference frequency, a first comparator comprising a plurality of resistors connected in a bridge circuit and four non-linear devices having one terminal connected in common and one terminal of each of said devices being connected to one leg of the bridge, a first phase splitter serving to receive the first pulses and apply the same to an opposite pair of bridge terminals, a second phase splitter serving to receive the second pulses and serving to apply the same to the other opposite pair of bridge terminals, filter means connected to receive the signal from the common terminal of the non-linear devices, and serving to form an error signal which is dependent upon the phase difference between the pulses applied to the terminals of the bridge, means adapted to receive said error signal and serving to generate an intermediate output signal having a frequency which is controlled by the first error signal, means for comparing the phase between successive generated first pulses and serving to generate a second error signal, and means adapted to receive the second error signal and said intermediate output signal and to form an output signal whose phase is instantaneously controlled in accordance with the second error signal, said output signal being applied to said head driving means.

6. In a system of the character described, a rotatable magnetic head assembly including at least one transducer unit, a tape transport means for moving the tape lengthwise past and in cooperative relationship with the head assembly whereby the unit sweeps successively across the tape, means for driving the head assembly, pulse generating means for generating first pulses at a frequency dependent upon the speed of rotation of the head assembly, means for generating second pulses having a reference frequency, phase comparator means serving to receive said first and second pulses and serving to generate a first error signal which is dependent upon the phase difference between the same, an oscillator including a frequency determining circuit for generating an intermediate output signal, means connected to receive the error signal and serving to control the impedance of the frequency determining circuit whereby the frequency of oscillation of the oscillator is controlled by said error signal for limiting the instantaneous frequency changes in said oscillator between predetermined limits, means forming a second error signal which is dependent upon instantaneous changes in the speed of rotation of the rotary head assembly, means serving to receive said second error signal and intermediate output signal and forming an output signal having its instantaneous phase controlled by the second error signal, said output signal being applied to said head driving means.

7. A system as in claim 6 in which said oscillator includes means serving to simultaneously slowly change the limits between which the instantaneous frequency changes are limited.

8. In a system of the character described, a rotatable magnetic head assembly including at least one transducer unit, a tape transport means for moving the tape lengthwise past and in cooperative relationship with the head assembly whereby the unit sweeps successively across the tape, means for driving the head assembly, pulse generating means for generating first pulses at a frequency dependent upon the speed of rotation of the head assembly, means for generating second pulses having a reference frequency, a first comparator comprising a plurality of resistors connected in a bridge circuit and four non-linear devices having one terminal connected in common and one terminal of each of said devices being connected to one leg of the bridge, a first phase splitter serving to receive the first pulses and apply the same to an opposite pair of bridge terminals, a second phase splitting means connected to receive the second pulses and serving to apply the same to the other pair of terminals of the bridge circuit, and filter means connected to receive the signal from the common terminal of the non-linear elements and serving to form a first error signal which is dependent upon the phase difference between the pulses applied to the terminals of the bridge, an oscillator including a frequency determining circuit for generating an intermediate output signal, means connected to receive the first error signal and serving to control the impedance of the frequency determining circuit whereby the frequency of oscillation of the oscillator is controlled by said error signal, means for limiting the instantaneous frequency changes in said oscillator between predetermined limits, means for simultaneously slowly changing the limits, means forming a second error signal which is dependent upon changes in the speed of rotation of the rotary head assembly, means serving to receive said second error signal and the intermediate output signal and forming an output signal having its instantaneous phase controlled by the second error signal, said signal being applied to said head assembly driving means.

9. In a system of the character described, a rotatable magnetic head assembly including at least one transducer unit, a tape transport means for moving the tape lengthwise and in cooperative relationship with the head assembly whereby the unit sweeps successively across the tape, means for driving the head assembly, pulse generating means for generating first pulses at a frequency dependent upon the speed of rotation of the head assembly, means for generating second pulses having a reference frequency, a control magnetic head adapted to form a record track lengthwise on one side margin of said magnetic tape, means for applying a signal having a frequency which is dependent upon the frequency of the first pulses to the control magnetic head, gate means adapted to be opened by the second pulses, means for applying pulses with the frequency dependent upon the first pulses to said gate whereby when said first and second pulses are coincident a pulse is passed to the control magnetic head, phase comparator means serving to receive said first and second pulses and adapted to generate a first error signal which is dependent upon the phase difference between the same, means adapted to receive said error signal and serving to generate an intermediate output signal having a frequency which is controlled thereby, means for comparing the phase between successive generated pulses and serving to generate a second error signal, means adapted to receive the second error signal and said intermediate output signal and form an output signal whose phase is instanstaneously controlled in accordance with the second error signal, said signal being applied to said head assembly driving means.

10. In a system for recording a video signal of the type having signal portions and synchronizing information in which a magnetic tape is driven lengthwise in cooperative relationship with a rotary head assembly to form successive record tracks extending crosswise of the tape, means for deriving a first signal having a frequency dependent upon the speed of rotation of the magnetic head assembly, means for deriving a reference signal having a frequency dependent upon the frequency of the synchronizing information, means adapted to receive said signals and to form an intermediate output signal having its phase controlled by the phase difference between said signals, means forming an error signal dependent upon instantaneous changes in the frequency of the first signal, and means serving to receive said error signal and said intermediate output signal and forming an output signal having an instantaneous phase controlled by the error signal, said output signal being applied to said rotary magnetic head assembly for driving the same.

11. In a system of the character described in which the magnetic tape is driven lengthwise in cooperative relationship with a rotary magnetic head assembly to form successive record tracks extending crosswise of the tape and past a stationary magnetic head adapted to form a track lengthwise on one side margin of the magnetic tape, means for deriving a first signal having a frequency dependent upon the speed of rotation of the head assembly, a source of reference signal of reference frequency, gating means, and means for applying the reference signal and the first signal to said gate whereby the first signal is passed and recorded when both said signals are coincident.

References Cited in the file of this patent

UNITED STATES PATENTS

| | | |
|---|---|---|
| 2,715,202 | Turner et al. | Aug. 9, 1955 |
| 2,756,335 | Snyder | July 24, 1956 |
| 2,756,336 | Christensen | July 24, 1956 |
| 2,782,355 | Wilcox | Feb. 15, 1957 |
| 2,864,895 | Bryant | Dec. 16, 1958 |
| 2,876,295 | Irby | Mar. 3, 1959 |
| 2,944,108 | Houghton | July 5, 1960 |

FOREIGN PATENTS

| | | |
|---|---|---|
| 715,583 | Great Britain | Sept. 15, 1954 |